(12) United States Patent
Konno et al.

(10) Patent No.: US 8,134,893 B2
(45) Date of Patent: Mar. 13, 2012

(54) OPTICAL RECORDING HEAD AND OPTICAL RECORDING APPARATUS

(75) Inventors: Kenji Konno, Sakai (JP); Hiroaki Ueda, Suita (JP); Manami Kuiseko, Kyoyo (JP); Naoki Nishida, Kusatsu (JP); Koujirou Sekine, Ibaraki (JP); Masahiro Okitsu, Higashiosaka (JP); Hiroshi Hatano, Takatsuki (JP)

(73) Assignee: Konica Minolta Opto, Inc., Hachioji (JP)

( * ) Notice: Subject to any disclaimer, the term of this patent is extended or adjusted under 35 U.S.C. 154(b) by 681 days.

(21) Appl. No.: 12/297,072

(22) PCT Filed: Apr. 2, 2007

(86) PCT No.: PCT/JP2007/057389
§ 371 (c)(1),
(2), (4) Date: Oct. 14, 2008

(87) PCT Pub. No.: WO2007/125730
PCT Pub. Date: Nov. 8, 2007

(65) Prior Publication Data
US 2009/0196127 A1    Aug. 6, 2009

(30) Foreign Application Priority Data

Apr. 25, 2006 (JP) ................................. 2006-120365

(51) Int. Cl.
*G11B 11/00* (2006.01)
(52) U.S. Cl. ...................................... 369/13.17; 369/300

(58) Field of Classification Search ............... 369/13.17, 369/112.03, 300, 13.32, 13.24
See application file for complete search history.

(56) References Cited

U.S. PATENT DOCUMENTS

| 6,181,673 B1 * | 1/2001 | Wilde et al. ................... 369/300 |
| 2010/0208557 A1 * | 8/2010 | Kuiseko et al. ............ 369/13.17 |

FOREIGN PATENT DOCUMENTS

| JP | 2000-90475 A | 3/2000 |
| JP | 2000-113485 A | 4/2000 |
| JP | 2001-28139 A | 1/2001 |
| JP | 2003-6803 A | 1/2003 |
| JP | 2003-6913 A | 1/2003 |
| WO | WO 2007/125730 A1 | 11/2007 |

OTHER PUBLICATIONS

Japanese Notice of Reasons for Refusal dated Feb. 8, 2011, for the counterpart Japanese Application, together with an English translation thereof.
Notice of Reasons of Refusal cited in Japanese Patent Application No. 2008-513119 dated Aug. 30, 2011.

* cited by examiner

*Primary Examiner* — Ali Neyzari
(74) *Attorney, Agent, or Firm* — Cozen O'Connor

(57) ABSTRACT

Provided is an optical recording head in which a light beam from a light source is collected by an optical element and reflected on a reflecting surface to be formed into a spot light. Since a support portion for supporting the light source of the optical element at a predetermined position and the reflection surface for reflecting the light beam are formed integrally with each other, it is not required to perform the positioning thereof, and light can be collected to a very small spot with high efficiency, and an optical recording head and an optical recording apparatus having low heights can be provided.

16 Claims, 5 Drawing Sheets

FIG. 5(1-a)
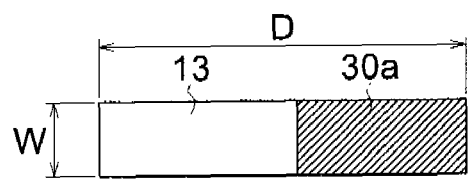
FIG. 5(1-b)
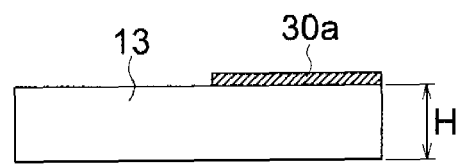
FIG. 5(2-a)
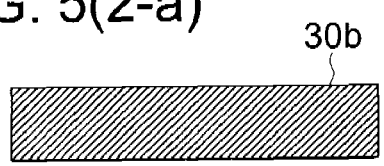
FIG. 5(2-b)
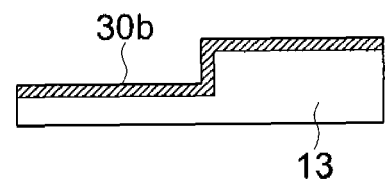
FIG. 5(3-a)
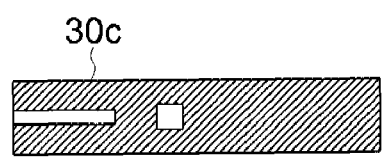
FIG. 5(3-b)
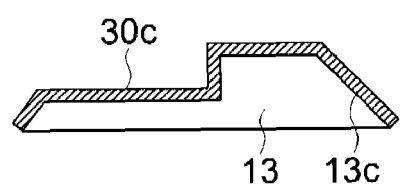
FIG. 5(4-a)
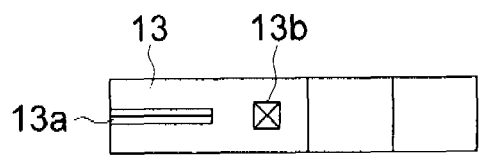
FIG. 5(4-b)
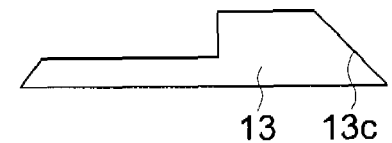
FIG. 5(5-a)
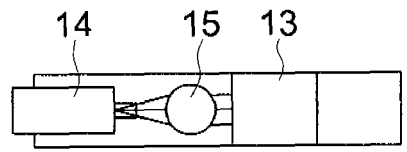
FIG. 5(5-b)
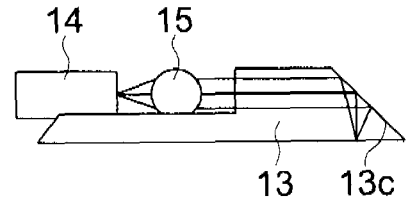

FIG. 6(1-a) 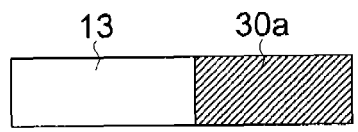
FIG. 6-(1-b) 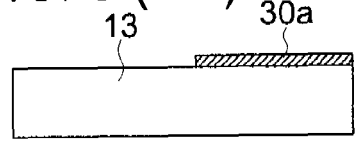
FIG. 6(2-a) 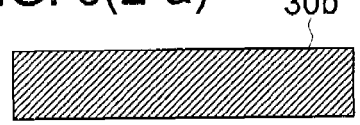
FIG. 6(2-b) 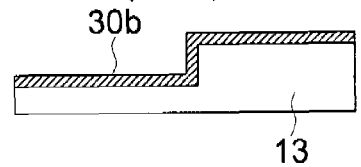
FIG. 6(3-a) 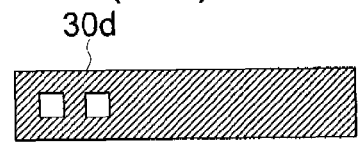
FIG. 6(3-b) 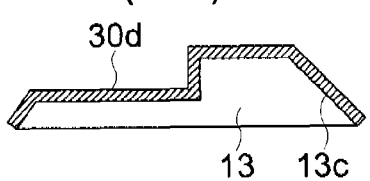
FIG. 6(4-a) 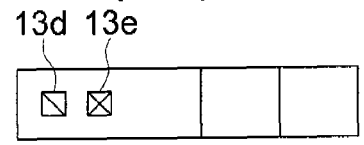
FIG. 6(4-b) 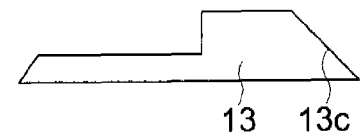
FIG. 6(5-a) 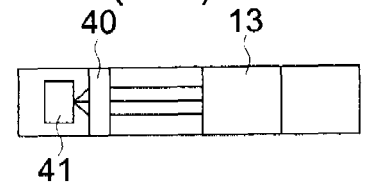
FIG. 6(5-b) 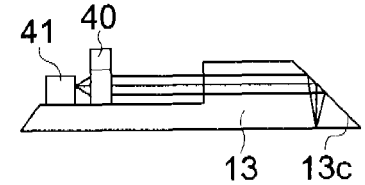

OPTICAL RECORDING HEAD AND OPTICAL RECORDING APPARATUS

RELATED APPLICATIONS

This application is a National Stage of International Application No. PCT/JP2007/057389, filed with the Japanese Patent Office on Apr. 2, 2007, which is based on Japanese Patent Application No. 2006-120365.

TECHNICAL FIELD

The present invention relates to an optical recording head and an optical recording apparatus.

BACKGROUND ART

In the magnetic recording method, as recording density becomes higher, the effect of external temperature and the like on a magnetic bit is more remarkable. Accordingly, a magnetic recording medium that has a higher magnetic coercive force is necessary, but when this type of recording medium is used, a higher magnetic field is required at the time of recording. The upper limit of the magnetic field that can be generated by the recording head depends on the saturation magnetic flux density, but the value the magnetic field is near the material limit, and a dramatic increase cannot be expected. To address this problem, a method has been proposed to ensure the stability of the recorded magnetic bit, which method is executed as follows: The recording medium is locally heated at the time of recording to cause magnetic weakening where the magnetic coercive force is small, and in that state magnetic recording is carried out before heating is stopped to allow natural cooling. This method is called the heat-assisted magnetic recording method.

In the heat-assisted magnetic recording method, heat is preferably momentarily applied to the recording medium. In addition, the mechanism for heating is not allowed to be in contact with the recording medium. For this reason heating is usually performed by utilizing light absorption, and the method using light for heating is called the light-assisted method. In the light-assisted method, in the case where ultra high density recording is carried out, the required spot diameter is about 20 nm, but because there is a diffraction limit in normal optical systems, the light cannot be focused to this extent.

To cope with this problem, a method has been proposed for obtaining a small spot diameter by irradiating a laser beam of a specific wavelength on the optical head in which silicon with high refractive index is used as the solid immersion lens (See Patent Document 1, for example).

In addition, a near field optical head that utilizes a near field beam generated at the optical opening of a size less than that of the irradiation beam wavelength is used, but there is a problem that the light efficiency of the conventional near field optical head is poor.

For this reason, a method has been proposed in which the utilization efficiency of light is improved by providing a lens and metal grating for plasmon generation on the transparent slider formed on the substrate (See Patent Document 2, for example).

In this method, a laser beam of a suitable wavelength is focused using the optical system and irradiated on a metal piece (called a plasmon probe) having a size of several tens of nm to generate near field light, and the near field light is used as a heating means.

Patent Document 1: Unexamined Japanese Patent Application Publication No. 2000-90475
Patent Document 2: Unexamined Japanese Patent Application Publication No. 2003-6913

DISCLOSURE OF INVENTION

Object of Invention

However, in the method disclosed in Patent Document 1, the structure uses a solid immersion lens, and thus it is necessary to irradiate light from above the optical head. This is a problem in this method that this arrangement much increases the height of the optical head.

On the other hand, in the method disclosed in Patent Document 2, there is a large amount of light loss of the light from a deflection element for guiding the light from the light source to the metal diffraction grating for Plasmon generation, and the utilization efficiency of light is poor. In addition, there is a problem that it has a structure in which an optical fiber is placed between a silicon substrate and a transparent slider, and thereby increasing the height of the optical head.

The present invention was conceived in view of the problems described above, and an object thereof is to provide a thin optical recording head and optical recording apparatus that are capable of focusing a light beam to a small spot with high efficiency.

Means for Solving the Object

The problems of the present invention can be solved by the following configurations.

1. An optical recording head for performing information recording by use of light on a recording medium, the head comprising:
    a light source section which is adapted to emit light;
    an optical element for focusing and emitting a light beam coming in from the light source section; and
    a support body; the support body including:
        a support portion which supports the light source section at a predetermined position; and
        a reflection surface for reflecting a light beam coming in from the optical element.
2. The optical recording head of Item 1, wherein the light beam reflected by the reflection surface is focused on an end face of the support body.
3. The optical recording head of Item 1 or 2, wherein the optical element is a diffractive optical element.
4. The optical recording head of any one of Items 1 to 3, comprising:
    a slider which is adapted to move above and relative to the recording medium which stores information; and
    an optical waveguide which is provided on the slider such that the optical waveguide penetrates the slider in a direction crossing a direction of the relative movement of the slider with respect to the recording medium,
    wherein, the light beam reflected by the reflection surface is focused on an end face of the optical waveguide.
5. The optical recording head of Item 4, wherein the support body and the slider are integrally formed.
6. The optical recording head of any one of Items 1 to 5, wherein the support body is made of silicon.
7. The optical recording head of any one of Items 1 to 6, wherein the support body includes an optical element support portion which supports the optical element.
8. The optical recording head of any one of claims 1 to 7, wherein the support portion has a v-groove shape.

9. The optical recording head of any one of Items 1 to 8, comprising:
a magnetic recording element which is adapted to perform magnetic information recording.

10. An optical recording apparatus, comprising:
a recording medium;
an optical recording head of any one of claims 1 to 9; and
a control section which is adapted to control the optical recording head.

11. An optical recording head for performing information recording by use of light on a recording medium, the head comprising:
a light source section which is adapted to emit light;
an optical element for focusing and emitting a light beam coming in from the light source section; and
a support body; the support body including:
a support portion which supports the optical element at a predetermined position; and
a reflection surface for reflecting a light beam coming in from the optical element.

12. The optical recording head of Item 11, wherein the light beam reflected by the reflection surface is focused on an end face of the support body.

13. The optical recording head of Items 11 or 12, wherein the optical element is a diffractive optical element.

14. The optical recording head of any one of Items 11 to 13, comprising:
a slider which is adapted to move above and relative to the recording medium which stores information; and
an optical waveguide which is provided on the slider such that the optical waveguide penetrates the slider in a direction crossing a direction of the relative movement of the slider with respect to the recording medium,
wherein, the light beam reflected by the reflection surface is focused on an end face of the optical waveguide.

15. The optical recording head of Item 14, wherein the support body and the slider are integrally formed.

16. The optical recording head of any one of Items 11 to 15, wherein the support body is made of silicon.

17. The optical recording head of any one of Items 11 to 16, wherein the support body includes an optical element support portion which supports the optical element.

18. The optical recording head of any one of Items 11 to 17, comprising:
a magnetic recording element which is adapted to perform magnetic information recording.

19. An optical recording apparatus, comprising:
a recording medium;
an optical recording head of any one of claims 11 to 18; and
a control section which is adapted to control the optical recording head.

20. An optical recording head for performing information recording by use of light on a recording medium, the head comprising:
a light source section which is adapted to emit light;
an optical element for focusing and emitting a light beam coming in from the light source section; and
a support body; the support body including:
a support portion which supports the light source section and the optical element at a predetermined position; and
a reflection surface for reflecting a light beam coming in from the optical element.

EFFECT OF THE INVENTION

According to the present invention, because the support portion for supporting the light source or the optical element at a prescribed position and the reflection surface for reflecting the light beam are integrally formed in the optical recording head which forms a spotlight by focusing the light beam from the light source using the optical element and reflecting it by the reflection surface, an optical recording head and optical recording apparatus is provided in which positioning and the like are not necessary; a light beam is efficiently focused to a small spot; and which has a low height.

BRIEF DESCRIPTION OF THE DRAWINGS

FIGS. 5(1-a)-5(5-b) are explanatory diagrams for describing the steps for manufacturing a support body 13 which uses a sphere lens 15.

FIGS. 6(1-a)-6(5-b) are explanatory diagrams for explaining the steps for manufacturing a support body 13 which uses a diffractive optical element.

DESCRIPTION OF THE NUMERALS

| | |
|---|---|
| 1 | Case |
| 2 | Disk |
| 3 | Optical recording head |
| 10 | Magnetic recording apparatus |
| 11 | Slider |
| 12A | Waveguide |
| 12B | Magnetic recording portion |
| 12C | Magnetic reproducing portion |
| 13 | Support body |
| 13c | Total reflection surface |
| 14 | Optical fiber (Light source section) |
| 15 | Sphere lens (Optical system) |
| 16 | Hemispherical lens (Optical system) |
| 30 | Plano-convex lens (Optical system) |
| 40 | Diffractive optical element (Optical system) |
| 41 | Semiconductor laser (Light source section) |

BEST MODE FOR CARRYING OUT THE INVENTION

The light-assisted type magnetic recording head which is an example of the optical recording head of the present invention and the magnetic recording apparatus comprising the light-assisted type magnetic recording head will be described with reference to the drawings. However the present invention is not to be limited to these examples. It should be noted that the same or equivalent parts in each of the embodiments are denoted by the same numerical symbols, and repeated description of these parts are omitted.

Figure 1:
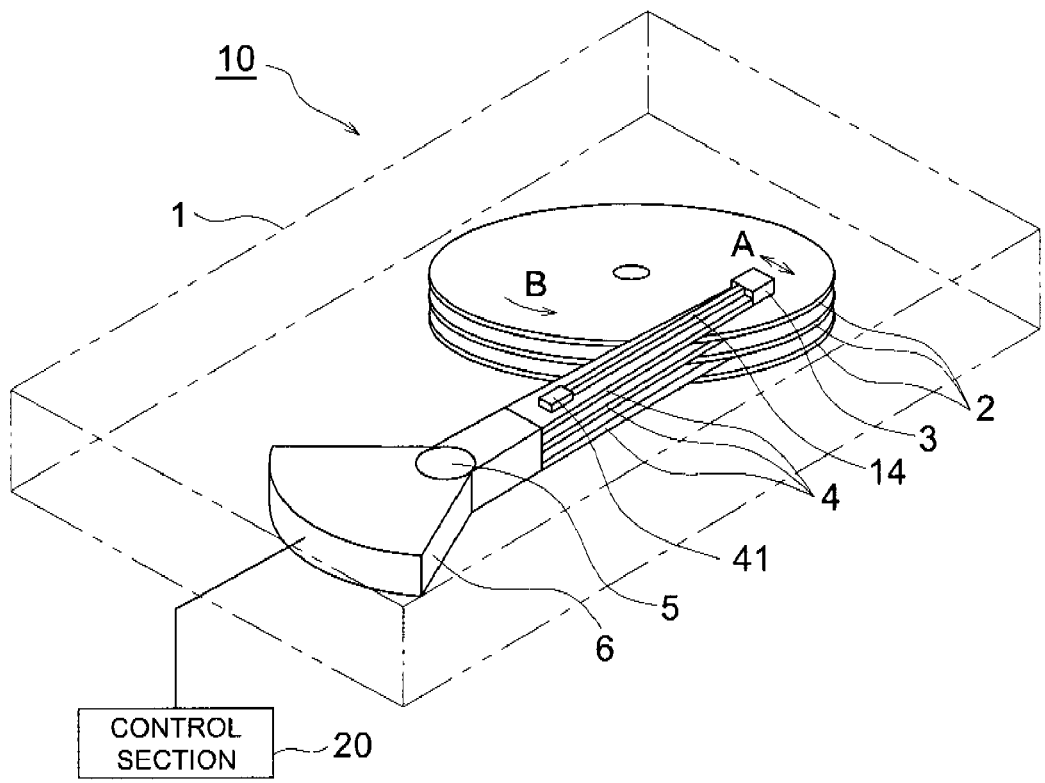
FIG. 1 is a perspective view showing an example of the schematic structure of a light-assisted type magnetic recording apparatus.

FIG. 1 shows the schematic structure of a hard disc apparatus as one of examples of the magnetic recording apparatus in which a light-assisted type magnetic recording head is installed. This magnetic recording apparatus 10 is equipped in a case 1 with: recording disks (magnetic recording medium) 2; a suspension 4 that is provided rotatably in the direction of an arrow A (tracking direction) about a spindle 5 as a fulcrum; a tracking actuator 6 that is secured to the suspension 4; and a motor (not shown) that rotates the disk 2 in the direction of an arrow B. The magnetic recording apparatus is formed such that the magnetic recording head 3 is capable of relative movement while being suspended above the disk 2. The magnetic recording apparatus 10 further includes a control section 20, which controls the operation of the aforementioned light-assisted type magnetic recording head 3 and all the parts of the magnetic recording apparatus 10.

Figure 2:
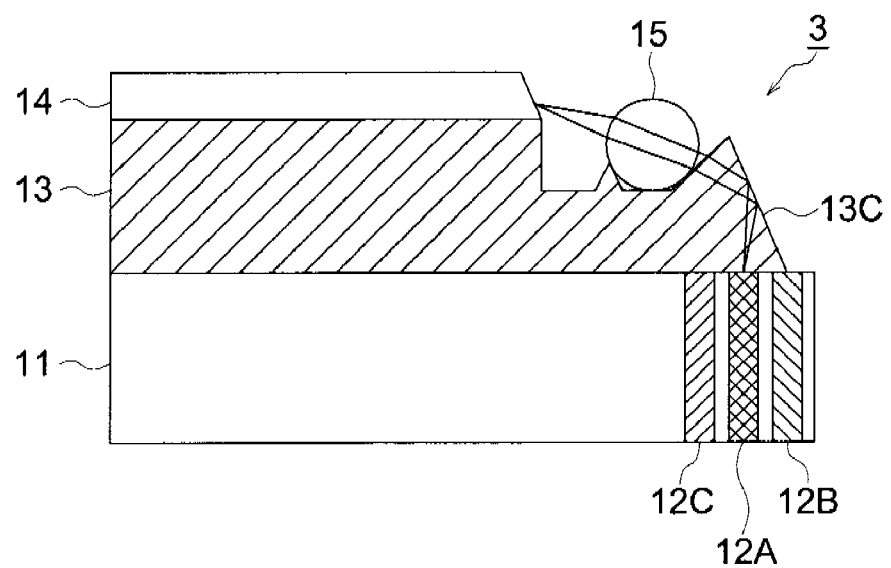
FIG. 2 is a cross-section showing Example 1 of an optical recording head.
Figure 3:
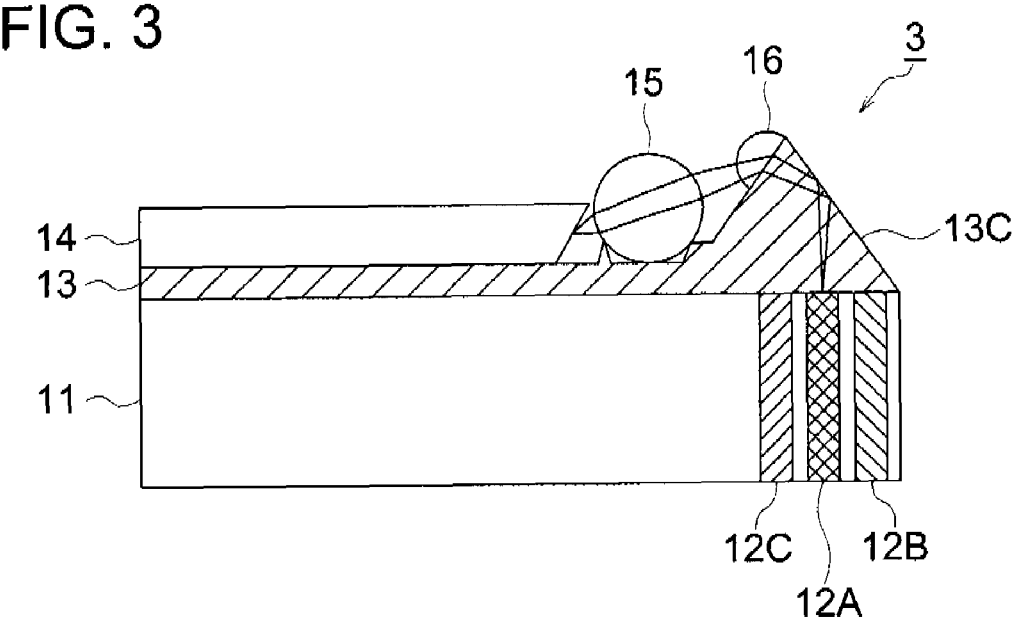
FIG. 3 is a cross-section showing Example 2 of the optical recording head.
Figure 4:
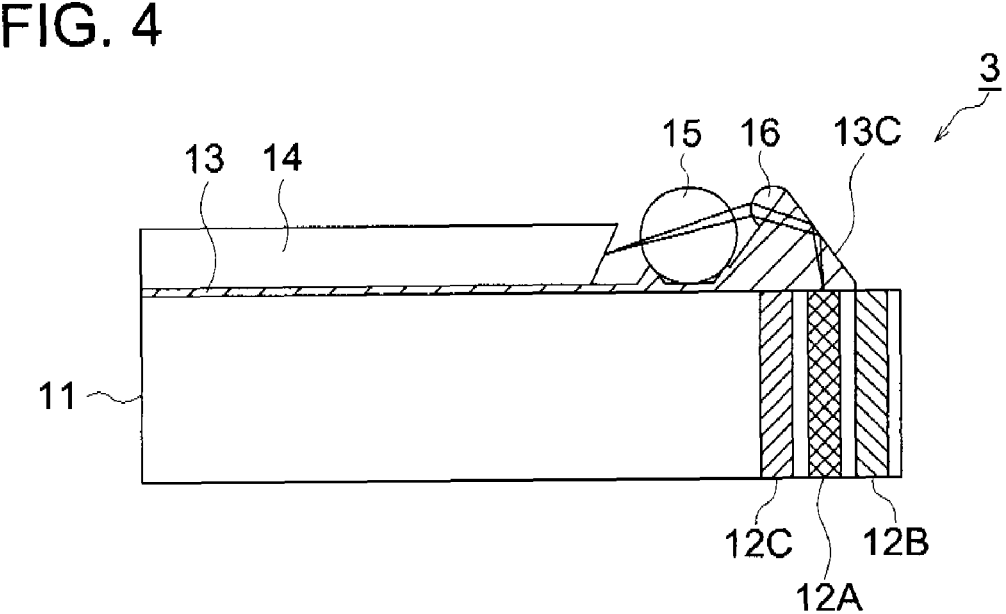
FIG. 4 is a cross-section showing Example 3 of the optical recording head.

The magnetic recording heads 3 shown in FIG. 2, FIG. 3 and FIG. 4 are optical recording heads which are embodiments of the present invention and use light for recording information on the disk 2, and include: a light source section, shown in FIG. 1, that is formed of a semiconductor laser 41 and an optical fiber 14; a light assist portion having a waveguide 12A for performing spot heating of a recording portion of the disk 2, using a near infrared laser beam; an optical system which guides the infrared laser beam from the light source section to the light assist portion; a magnetic recording portion 12B for writing magnetic information on the recording portion of the disk 2; and a magnetic reproducing portion 12C for reading magnetic information recorded on the disk 2. The semiconductor laser 41 that constitutes the light source section is an infrared light source, and a near infrared laser beam (1550 nm, 1310 nm) emitted from the semiconductor laser 41 is guided by the optical fiber 14 to a prescribed position. The infrared laser beam emitted from the light source section is guided to the optical system by the waveguide 12A, and the beam passing into from the beam incidence side end surface of the waveguide 12A is emitted from the magnetic recording head 3 through the end surface at the opposite side after passing through the waveguide 12A. When the near infrared laser beam emitted from the waveguide 12A is irradiated onto the disk 2 as a small light spot, the temperature of the irradiated portion of the disk 2 is temporarily increased, and the magnetic coercive force of the disk 2 accordingly reduces. Magnetic information is written, by the magnetic recording portion 12B, on the irradiated portion in a state where the magnetic coercive force is reduced. The magnetic recording head 3 will be described in detail below.

FIG. 2, FIG. 3 and FIG. 4 show the cross sections of the specific optical structures (optical surface configuration, optical paths and the like) of the magnetic recording head 3 as Examples 1, 2 and 3 respectively, and the construction data for Examples 1-3 are given in the following. In all of the construction data, ri (i=0, 1, 2, 3 . . . ) represents the radius of curvature (mm) of Si (i=0, 1, 2, 3 . . . ) which is the i-th surface counted from the light source side; di (i=0, 1, 2, 3 . . . ) represents the i-th axial surface separation (mm) counted from the light source section side; and Ni (i=0, 1, 2, 3 . . . ) represents the refractive index at the used wavelength of the i-th medium counted from the light source section side; the X axis inclination ai(i=0, 1, 2, 3 . . . ) and y axis decentering bi (i=0, 1, 2, 3 . . . ) represent the inclination angle (°) and the amount (mm) of the decentering of the surface Si in the X-Y coordinate system where they cross each other. It is to be noted that the light source position is equivalent to the output end surface of the optical fiber 14. In addition, the NA (numerical aperture) of the light source and the used wavelength are also shown.

EXAMPLE 1

NA of Light source=0.08333

Used wavelength: 1.31 (μm)

TABLE 1

| Surface | Radius of curvature | Axial surface separation | Refractive index | X-axis inclination | Y-axis decentering |
|---|---|---|---|---|---|
| S0 | r0 = ∞ | d0 = 0.1 | — | a0 = 0 | b0 = 0 (Light source) |
| S1 | r1 = 0.075 | d1 = 0.15 | N1 = 1.75030841 | a1 = 0 | b1 = 0 |
| S2 | r2 = −0.075 | d2 = −0.02 | — | a2 = 0 | b2 = 0 |
| S3 | r3 = — | d3 = 0 | — | a3 = 35.26 | b3 = 0 |
| S4 | r4 = ∞ | d4 = 0.2 | N2 = 3.51136585 | a4 = 0 | b4 = 0 |
| S5 | r5 = — | d5 = 0 | — | a5 = −70.528 | b5 = 0 |
| S6 | r6 = — | d6 = 0 | — | a6 = 0 | b6 = 0.067962472 |
| S7 | r7 = ∞ | d7 = 0 | — | a7 = 0 | b7 = 0 (Total reflection surface) |
| S8 | r8 = ∞ | d8 = −0.4 | N3 = 3.51136585 | a8 = 0 | b8 = 0 |
| S9 | r9 = — | d9 = 0 | — | a9 = −61.03 | b9 = 0 |
| S10 | r10 = — | d10 = 0 | — | a10 = 0 | b10 = −0.35006874 |
| S11 | r11 = ∞ | d11 = 0 | N4 = 3.51136585 | a11 = 0 | b11 = 0 |
| S12 | r12 = ∞ | | | a12 = 0 | b12 = 0 |

EXAMPLE 2

NA of Light source=0.08333

Used wavelength: 1.31 (μm)

TABLE 2

| Surface | Radius of curvature | Axial surface separation | Refractive index | X-axis inclination | Y-axis decentering |
|---|---|---|---|---|---|
| S0 | r0 = ∞ | d0 = 0.0402565 | — | a0 = 0 | b0 = 0 (Light source) |

TABLE 2-continued

| Surface | Radius of curvature | Axial surface separation | Refractive index | X-axis inclination | Y-axis decentering |
|---|---|---|---|---|---|
| S1 | r1 = 0.075 | d1 = 0.15 | N1 = 1.50358291 | a1 = 0 | b1 = 0 |
| S2 | r2 = −0.075 | d2 = 0.05 | — | a2 = 0 | b2 = 0 |
| S3 | r3 = — | d3 = 0 | — | a3 = 42.4 | b3 = 0 |
| S4 | r4 = ∞ | d4 = 0 | — | a4 = 0 | b4 = 0.04259 |
| S5 | r5 = — | d5 = 0.0466425 | N2 = 1.50358291 | a5 = 0 | b5 = 0 |
| S6 | r6 = — | d6 = 0 | N3 = 1.50358291 | a6 = 0 | b6 = 0 |
| S7 | r7 = ∞ | d7 = 0.3 | N4 = 3.51136585 | a7 = 0 | b7 = 0 |
| S8 | r8 = ∞ | d8 = 0 | — | a8 = −70.528779 | b8 = 0 |
| S9 | r9 = — | d9 = 0 | — | a9 = 0 | b9 = 0.14647875 |
| S10 | r10 = — | d10 = 0 | — | a10 = 0 | b10 = 0 (Total reflection surface) |
| S11 | r11 = ∞ | d11 = −0.25 | N5 = 3.51136585 | a11 = 0 | b11 = 0 |
| S12 | r12 = — | d12 = 0 | — | a12 = −54.738842 | b12 = 0 |
| S13 | r13 = — | d13 = 0 | — | a13 = 0 | b13 = −0.20163192 |
| S14 | r14 = ∞ | d14 = 0 | N6 = 3.51136585 | a14 = 0 | b14 = 0 |
| S15 | r15 = ∞ | | | a15 = 0 | b15 = 0 |

EXAMPLE 3

NA of Light source NA 0.08333
Used wavelength: 1.31 (μm)

TABLE 3

| Surface | Radius of curvature | Axial surface separation | Refractive index | X-axis inclination | Y-axis decentering |
|---|---|---|---|---|---|
| S0 | r0 = ∞ | d0 = 0.0402565 | — | a0 = 0 | b0 = 0 (Light source) |
| S1 | r1 = 0.075 | d1 = 0.15 | N1 = 1.50358291 | a1 = 0 | b1 = 0 |
| S2 | r2 = −0.075 | d2 = 0.01 | — | a2 = 0 | b2 = 0 |
| S3 | r3 = — | d3 = 0 | — | a3 = 42.4 | b3 = 0 |
| S4 | r4 = — | d4 = 0 | — | a4 = 0 | b4 = 0.0205455 |
| S5 | r5 = 0.0225 | d5 = 0.0225 | N2 = 1.50358291 | a5 = 0 | b5 = 0 |
| S6 | r6 = ∞ | d6 = 0 | N3 = 1.50358291 | a6 = 0 | b6 = 0 |
| S7 | r7 = ∞ | d7 = 0.15 | N4 = 3.51136585 | a7 = 0 | b7 = 0 |
| S8 | r8 = ∞ | d8 = −0.8 | — | a8 = −70.528779 | b8 = 0 |
| S9 | r9 = — | d9 = 0 | — | a9 = 0 | b9 = 0.073239144 |
| S10 | r10 = — | d10 = 0 | — | a10 = 0 | b10 = 0 Total reflection surface) |
| S11 | r11 = ∞ | d11 = −0.125 | N4 = 3.51136585 | a11 = 0 | b11 = 0 |
| S12 | r12 = ∞ | d12 = 0 | — | a12 = −53.746244 | b12 = 0 |
| S13 | r13 = — | d13 = 0 | — | a13 = 0 | b13 = −0.10080073 |
| S14 | r14 = ∞ | d14 = 0 | N6 = 3.51136585 | a14 = 0 | b14 = 0 |
| S15 | r15 = ∞ | | | a15 = 0 | b15 = 0 |

Examples 1-3 (FIG. 2-FIG. 4) are magnetic recording heads of the type in which total reflection is occurred in the optical path, and correspond to the magnetic recording head in FIG. 1. In FIG. 2 to FIG. 4, 11 is the slider, 12A is the optical waveguide, 12B is the magnetic recording portion, 12C is the magnetic reproducing portion, 13 is the support body, 14 is the optical fiber, and 15 is the sphere lens. In FIG. 3 and FIG. 4, 16 is the hemispherical lens. It is to be noted that the sphere lens 15 and the hemispherical lens 16 are the optical elements of the present invention.

The support body 13 which supports the optical fiber 14 and the sphere lens 15 is a transparent member that is formed of silicon and has a total reflection surface 13c which totally reflect the incident light beam. It is to be noted that silicon is used for the support body 13 of Examples 1-3, but materials other than silicon may also be used. In particular, optical glass (such as SF6 and the like), optical resins (such as acrylic, polycarbonate or cycloolefein (ZEONEX (trade name) manufactured by Japan Zeon) resins. In the case of optical glass, a method in which the base material is reheated in a molding die to be molded may be used, while in the case of the optical resin, a method employing the injection molding method can be used, and in both cases stable mass production can be realized at low cost.

Of these, silicon has a very high refraction index with respect to optical glass and optical resin, and using silicon for the support body 13 has advantages that the angle of the total reflection can be easily set and the curvature of the optical element can be made smaller and the error sensitivity can thus be lower.

In Examples 1-3, the magnetic recording portion 12B is a magnetic recording element that writes magnetic information in the disk 2, the magnetic reproducing portion 12C is a magnetic reproducing element which reads out the magnetic information stored in the disk 2, and the waveguide 12A is an optical assist element that performs spot heating of the recording portion of the disk 2 with a near infrared laser beam.

With the light-assisted method, the spot diameter required for performing ultra high density recording is about 20 nm, but from the point of light usage efficiency, the mode field diameter (MFD) at the entrance of the waveguide 12A is preferably about 0.3 µm. However, it is difficult to realize it only by the support body 13 with the optical fiber 14 and the optical system 15, and it is necessary to perform spot size conversion for reducing the spot diameter from about 5 µm to several hundred nm. The waveguide 12A is the spot size conversion waveguide of the present invention, and it spot-size-converts the mode field diameter at the light incident side to make the mode field diameter at the light emission side smaller. Regarding the shape of the core of the waveguide for making the mode field diameter smaller, for example, the diameter of the core gradually gets larger from the light incident side to the light emitting side.

It is to be noted that in each of the Examples, the magnetic reproducing portion 12C, the waveguide 12A, and the magnetic recording portion 12B are disposed in this order from the entering side to the exiting side of the recording region of the disk 2, but the order of arrangement is not limited to these examples. The magnetic recording portion 12B only needs be positioned immediately behind the waveguide 12A on the exiting side, and for example, the waveguide 12A, magnetic recording portion 12B, and magnetic reproducing portion 12C may thus be arranged in this order.

The magnetic recording head 3 of Example 1 includes: a light source section having an optical fiber 14; an optical system having a sphere lens 15 for guiding a near infrared laser beam from the optical fiber 14 to a waveguide 12A and a total reflection surface 13c of a support body 13; a support body on which a light source section and the optical system are mounted; and a slider 11 which relatively moves being suspended above a disk 2 with the support body 13 mounted thereon.

The slider 11 relatively moves being suspended above the disk 2, and if there is dust on the disk 2 or if the disk 2 has a defect, the slider 11 may come into contact with the disk 2. In order to reduce the wear of the slider 11 that is generated in such a case, a hard material with high wear resistance properties is preferably used as a material for the slider 11. For example, ceramic material including Al2O3 such as AlTiC, zirconia, TiN and the like may be used. In addition, as wear resistance processing, surface processing for increasing wear resistance properties may be performed on the disk2-side-surface of the slider 11. For example, a DLC (diamond like carbon) film has a transmittance of a near infrared light and hardness of Hv=3000 or more which is second to diamond.

The magnetic recording heads of Examples 2 and 3, include: a light source section having an optical fiber 14; an optical system having a sphere lens 15, a hemispherical lens 16 and a total reflection surface 13c of a support body 13 for guiding a near infrared laser beam from the optical fiber 14 to a waveguide 12A; the support body on which the light source section and the optical system are mounted; and a slider 11 which relatively moves being suspended above the disk 2 with the support body mounted thereon. In the slider 11 of Examples 1-3, the waveguide 12A, a magnetic recording portion 12B and a magnetic reproducing portion 12C are formed integrally with the slider 11. The waveguide 12A is formed such that it penetrates the slider along the direction that crosses the direction of movement of the slider. In addition, they are arranged in a configuration such that the light beam coming in from the optical element into the support body 13 is to form a focused spot after being subjected to total reflection at the total reflection surface 13c of the support body 13.

The optical structure of Example 1 (FIG. 2) will be described in the following. A V-groove (not shown) is provided in the support body 13 using anisotropic etching, and the optical fiber 14 having a diameter of 125 µm is placed in the V-groove. The light emission side surface of the optical fiber 14 is formed to have an inclination so that the light beam is emitted from the optical fiber 14 in the lower right direction and then goes into the sphere lens. The sphere lens 15, which is an equal magnification optical system, is made of a sapphire glass sphere with a diameter of 150 µm, and the light beam having passed through the sphere lens 15 goes into the support body, then it is deflected by total reflection on the total reflection surface 13c formed on the support body 13. The total reflection surface 13c is formed using an anisotropic etching method in which etching solution is caused to act on the silicon single crystal. The angle of the inclination of the total reflection surface 13c is approximately 70°. The structure of the support body 13 and the manufacturing steps thereof will be described later in detail.

The light beam deflected by the total reflection surface 13c is focused on the end surface of the support body 13 and is coupled to the waveguide 12A right below. The mode field diameter of the optical fiber 14 is approximately 10 µm, and the mode field diameter of the waveguide 12A is also approximately 10 µm, and the magnification of this optical system is hence made to be 1:1. When the light beam emitted from the waveguide 12A is irradiated onto the disk 2 in a small light spot, the temperature of the irradiated portion of the disk 2 temporarily increases, and the magnetic coercive force of the disk 2 is accordingly reduced. Magnetic information is written, by the magnetic recording portion 12B, in the irradiated portion, where the coercive force is reduced.

The optical structure of Example 2 (FIG. 3) will be described in the following. A groove (not shown) is provided in a support body 13 using anisotropic etching, and an optical fiber 14 with a diameter of 125 µm is placed in the V-groove. The light emission side end surface of the optical fiber 14 is formed to have an inclination so that the light beam is emitted from the optical fiber 14 in the lower right direction and then goes into a sphere lens 15. The sphere lens 15 is formed of a glass sphere (BK7) with a diameter of 0.15 mm, and the light beam is substantially collimated by the sphere lens 15. The light beam having passed through the sphere lens 15 goes into a hemispherical lens 16. The hemisphere lens 16 is formed of a glass hemisphere (BK7) with a diameter of 0.013285 mm, and it is bonded to the surface, of the support body 13, opposing the sphere lens 15. The substantially collimated light beam emitted from the sphere lens 15 is focused by the hemispherical lens 16 and then deflected by total reflection on the total reflection surface 13c. The angle of inclination of the total reflection surface 13c is approximately 70° and is formed using an anisotropic etching method. The light beam deflected by the total reflection surface 13c is focused on the end surface of the support body 13 and coupled to the waveguide 12A right below. The mode field diameter of the optical fiber 14 is approximately 10 µm and the mode field diameter of the waveguide 12A is also approximately 10 µm, and the magnification of this optical system is hence made to be 1:1. When the light beam emitted from the waveguide 12A is irradiated onto the disk 2 (FIG. 1) in a small light spot, the temperature of the irradiated portion of the disk 2 temporarily increases, and the coercive force of the disk 2 is reduced. Magnetic information is written, by the magnetic recording portion 12B, on the irradiated portion, where the coercive force is reduced.

In this manner, the height of the optical recording head can be reduced because the incident light beam is reflected by the total reflection surface 13c and then goes into the waveguide 12A. In addition, since total reflection is utilized, processing such as mirror coating of the reflection surface is unnecessary and stability is high, and this method is also excellent in terms of cost. When the material forming the deflection element is silicon, the refractive index is high, and the range of angles at which total refraction can be utilized is accordingly wide, and the degree of freedom for setting is increased. In addition, such a configuration allows manufacturing of the head to be relatively easy and stability of the optical element to be good.

In particular, the thickness of the support body 13 is reduced in the case where the fiber end is configured to have an negative taper angle as in Example 2.

Next, an example will be described in which magnification of the optical system is not 1:1.

FIG. 4 shows the third example and this is an example in which the magnification of the optical system is 1:2.

The optical structure of Example 3 (FIG. 4) will be described in the following. A V-groove (not shown) formed using anisotropic etching is provided in a support body 13, and an optical fiber 14 with a diameter of 125 μm is placed in the V-groove. The light output side end surface of the optical fiber 14 is formed to have an inclination such that the light beam is emitted from the optical fiber 14 in the lower right direction and then goes into a sphere lens 15. The sphere lens 15 is formed of a glass sphere (BK7) with a diameter of 0.15 mm, and the light beam is substantially collimated by the sphere lens 15. A hemispherical lens 16 is formed of a glass hemisphere (BK7) with a diameter of 0.045 mm and it is bonded on the surface opposing the sphere lens 15 of the support body 13. The substantially collimated light beam emitted from the sphere lens 15 is focused by the hemispherical lens 16 and then deflected by total reflection on the total reflection surface 13c. The angle of inclination of the total reflection surface 13c is approximately 70° and is formed by anisotropic etching. The light beam deflected by the total reflection surface 13c is focused on the waveguide right below and coupled to the optical waveguide. The mode field diameter of the optical fiber 14 is approximately 10 μm and the mode field diameter of the waveguide 12A is approximately 5 μm and the magnification of this optical system is hence made to be 1:2.

In this manner, the height of the optical recording head 3 can be reduced because the beam emitted from the optical fiber 14 (light source section) to the optical element passes through the support body 13 and is reflected by the total reflection surface 13c and then focused at the lower end surface of the support body. In addition, the support body 13 also functions as the deflection element and the number of parts can be accordingly reduced and the apparatus can thus be smaller, lighter and lower in cost.

In addition, in Example 3, the obtained light spot is smaller than that in Example 2 that has a similar optical structure. Further, the hemisphere lens 16 and the support body 13 can be made smaller, the entire magnetic recording head 3 can be accordingly made smaller.

Next, the structure of the support body 13 of the optical recording head and the manufacturing method thereof will be described in detail using FIGS. 5(1-a)-5(5-b). FIGS. 5(1-a)-5(5-b) are explanatory diagrams for explaining the steps for manufacturing the support body 13 in the optical recording head which uses sphere lens 15 as the optical system.

FIGS. 5(1-a)-(5-a) show front views, while FIGS. 5(1-b)-(5-b) show side views. The steps will be described in order from FIGS. 5(1-a) and (1-b).

FIGS. 5(1-a) and (1-b) show the state where the mask 30a is patterned on a solid rectangular silicone single crystal as a material for the support body 13. The size of the silicone single crystal is, for example, that D=1.2 mm, W=1.0 mm and H=0.3 mm. After the mask 30a is patterned in this manner, etching is performed using a method such as RIE (reactive ion etching) or ion milling.

FIG. 5(2-b) shows the result of performing etching in the previous step, and it shows the stage where some portion of the silicon single crystal has been stripped off and there is a height difference. A mask 30b is attached on the support body 13 as shown in FIGS. 5(2-a) and (2-b) in order to perform etching of the right side surface and the left side surface of the support body 13.

In the state shown in FIGS. 5(2-a) and 5(2-b), etching solution is applied to perform anisotropic etching. The anisotropic etching enables highly accurate processing with an accuracy of 1 micron or less in shape.

FIGS. 5(3-a) and (3-b) show the result of performing the anisotropic etching in the previous step, and they show the state where an inclined surface is formed at the right side surface and the left side surface. The inclined surface of the left side surface is the total reflection surface 13c. A mask 30c is patterned on the support body 13 as shown in FIGS. 5(3-a) and (3-b) in order to perform etching of a V-groove 13a and a mounting hole 13b. After this, the etching solution is applied to perform anisotropic etching.

FIGS. 5(4-a) and (4-b) show the result of performing anisotropic etching in the previous step and show the state where the V-groove 13a and the mounting hole 13b are formed on the support body 13. As described above, since anisotropic etching is used, the V-groove 13a and the mounting hole 13b are formed accurately on the support body 13.

FIGS. 5(5-a) and (5-b) show the state in which the optical fiber 14 is mounted in the V-groove 13a, and the sphere lens 15 is mounted in the mounting hole 13b. In the case where infrared light is used as a light source for the optical system that is formed in the above-mentioned manner, manufacturing errors of the support body manufactured by anisotropic etching is not need to be adjusted because the manufacturing errors are sufficiently small with respect to the wavelength of the light source. Another reason for using infrared light as the light source is that light with a wavelength of 1.2 μm or more can be easily transmitted through a support body made of silicon, and light usage efficiency is accordingly high.

The near infrared light beam emitted from the optical fiber 14 is emitted to the right in FIGS. 5(5-a) and (5-b) and then goes into the sphere lens 15. The sphere lens 15 is an equal magnification optical system formed of a sapphire glass sphere having a diameter of 0.15 mm and the light beam that is passed through the sphere lens 15 is made incident on the support body 13 and polarized by total reflection of the total reflection surface 13c formed on the support body 13. The light beam polarized at the total reflection surface 13c is focused on the end surface of the support body 13.

As described above, since the light beam passes through the support body 13 formed of silicon with a high refractive index until it is focused on the end surface of the support body 13, it is focused in a small spot. The refractive index of the silicon is, for example, about 3.5, and the spot diameter is reduced to about ½ of that in the case where glass material with a refractive index of 1.7 is used.

Next, regarding a manufacturing method and a structure of a support body 13 in the optical recording head which employs a diffractive optical element in an optical system, the difference between FIGS. 5(1-a)-5(5-b) and FIGS. 6(1-a)-6(5-b) will be described with reference to FIGS. 6(1-a)-6(5-b). FIGS. 6(1-a)-6(5-b) is an explanatory diagram for describing the steps for manufacturing the support body 13 in the optical recording head which uses a diffractive optical element in the optical system.

FIGS. 6(1-a)-(5-a) show front views, while FIGS. 6(1-b)-(5-b) show side views.

FIGS. 6(1-a), (1-b), (2-a), (2-b) show the same steps as FIGS. 5(1-a), (1-b), (2-a), (2-b) and descriptions thereof will be omitted.

FIGS. 6(3-a) and 6(3-b) show the result of performing anisotropic etching in the previous step, and they show the state where an inclined surface is formed at the right side surface and the left side surface. The inclined surface of the right side surface is a total reflection surface 13c. In this example, a mask 30d is patterned on the support body 13 as shown in FIGS. 6(3-a) and 6(3-b) in order to perform etching of a mounting hole 13d and a mounting hole 13e. After this, the etching solution is applied to perform anisotropic etching.

FIGS. 6(4-a) and (4-b) show the result of performing anisotropic etching in the previous step, and they show the state where the mounting hole 13d and the mounting hole 13e are formed in the support body 13. Because anisotropic etching is used, the mounting hole 13d and the mounting hole 13e are formed on the support body with an accuracy of 1 micron or less.

In FIGS. 6(5-a) and (5-b), 41 is a semiconductor laser which emits near infrared light and 40 is the diffractive optical element. The diffractive optical element 40 can be mass-produced of silicon by LSI manufacturing technology, and the price is accordingly low and its structure is remarkably small. As shown in FIGS. 6(5-a) and (5-b), the semiconductor laser 41 is mounted by bonding in the mounting hole 13d and the diffractive optical element 40 is mounted by bonding in the mounting hole 13e.

The near infrared light beam emitted from the semiconductor laser 41 is emitted to the right in FIGS. 6(5-a) and 6(5-b) and then goes into the diffractive optical element 40. The diffractive optical element 40 is an equal magnification optical system formed of silicon with a diameter of 125 μm, and the light beam having passed through the diffractive optical element 40 goes into the support body 13 and deflected by total reflection on the total reflection surface 13c formed on the support body 13. The light beam deflected by the total reflection surface 13c is focused on the end surface of the support body 13.

Figure 7:
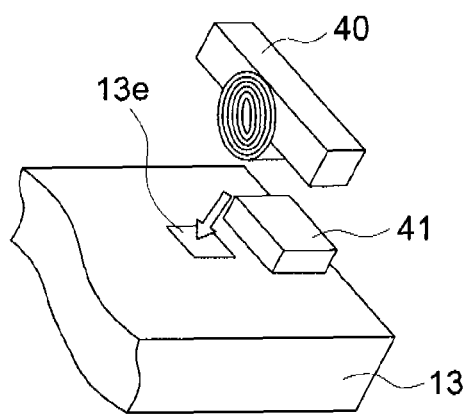
FIG. 7 is an explanatory diagram for describing the state in which a diffractive optical element 40 is mounted to the support body 13.

FIG. 7 is an explanatory diagram for describing the state in which the diffractive optical element 40 is mounted to the support body 13.

In FIG. 7, the semiconductor laser 41 is already mounted in the mounting hole 13d, and the diffractive optical element 40 is about to be mounted in the mounting hole 13e. Because each element is mounted in this manner in a mounting hole formed accurately by anisotropic etching, adjustment is not necessary and the manufacturing process is simply.

Next, a embodiment in which a support body 13 and a slider 11 are integrated will be described.

Figure 8:
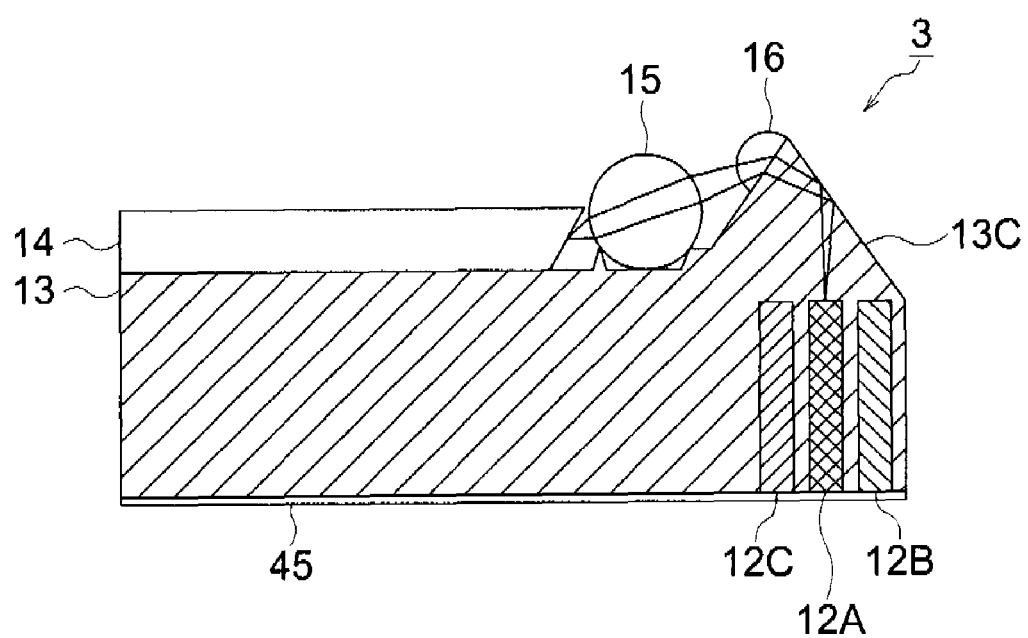
FIG. 8 is an explanatory diagram for describing an example in which the support body and a slider are integrated.

FIG. 8 is an explanatory drawing for describing the example in which the support body and the slider are integrated. The structure of an optical system is exactly the same as in the optical recording head described in Example 1 in FIG. 2 except that a slider portion and the support body 13 are integrally formed of silicon material.

A desired shape is obtained in the surface, which supports a light source and an optical element, of the support body 13 by repeating the etching steps described in FIGS. 5(1-a)-5(5-b) and FIGS. 6(1-a)-6(5-b). Similarly, holes in which a waveguide 12A, a magnetic recording portion 12B and a magnetic reproducing portion 12C are formed by an etching process.

Numerical symbol 45 in FIG. 8 is a film, and it is provided to improve the wear resistance properties of the disk 2. For example, in a case of a DLC (diamond like carbon) used as the film, it has a high transmittance of infrared light and hardness of Hv=3000 or more which is second to diamond.

As described above, according to the present invention, the support portion which supports the light source or the optical element at a prescribed position and the reflection surface for reflecting the light beam are integrally formed in the optical recording head in which a spotlight is formed by focusing the light beam after the light beam from the light source is reflected by the reflection surface, and thereby an optical recording head and optical recording apparatus can be provided in which positioning and the like is not necessary; high efficiency focusing in a small spot is possible; and which has a low height.

It is to be noted that suitable modifications of the detailed configuration and operations of each configuration constituting the optical recording head and optical recording apparatus of the present invention may be made without departing from the spirit of the invention.

The invention claimed is:

1. An optical recording head for performing information recording by use of light on a recording medium, the head comprising:
   a light source section which is adapted to emit light;
   an optical element for receiving a light beam from the light source section, and focusing and emitting the light beam received from the light source section; and
   a support body configured to receive the light emitted from the optical element so that the received light enters into the support body; the support body including:
      a support portion which supports the light source section at a predetermined position; and
      a total reflection surface for receiving and total reflecting the light beam having entered into the support body such that the light beam reflected by the total reflection surface is focused at a first position on an end face of the support body.

2. The optical recording head of claim 1, wherein the optical element is a diffractive optical element.

3. The optical recording head of claim 1, comprising:
   a slider which is adapted to move above and relative to the recording medium which stores information; and
   an optical waveguide which is provided on the slider such that the optical waveguide penetrates the slider in a direction crossing a direction of the relative movement of the slider with respect to the recording medium and a light incident end of the optical waveguide is located at the first position.

4. The optical recording head of claim 1, wherein the support body is made of silicon.

5. The optical recording head of claim 1, wherein the support body includes an optical element support portion which supports the optical element.

6. The optical recording head of claim 1, wherein the support portion has a v-groove shape.

7. The optical recording head of claim 1, comprising:
   a magnetic recording element which is adapted to perform magnetic information recording.

8. An optical recording apparatus, comprising:
   a recording medium;
   an optical recording head which is adapted to perform information recording by use of light on a recording medium, the head including:
      a light source section which is adapted to emit light;
      an optical element for receiving a light beam from the light source section, and focusing and emitting the light beam received from the light source section; and a support body configured to receive the light emitted from the optical element so that the received light enters into the support body; the support body having:
a support portion which supports the light source section at a predetermined position; and
a total reflection surface for receiving and total reflecting the light beam having entered into the support body such that the light beam reflected by the total reflection surface is focused on an end face of the support body, and
a control section which is adapted to control the optical recording head.

9. An optical recording head for performing information recording by use of light on a recording medium, the head comprising:
a light source section which is adapted to emit light;
an optical element for receiving a light beam from the light source section, and focusing and emitting the light beam received from the light source section; and
a support body; the support body including:
a support portion which supports the optical element at a predetermined position such that the light beam emitted from the optical element enters into the support body; and
a total reflection surface for receiving and total reflecting the light beam having entered into the support body such that the light beam reflected by the total reflection surface is focused at a first position on an end face of the support body.

10. The optical recording head of claim 9, wherein the optical element is a diffractive optical element.

11. The optical recording head of claim 9, comprising:
a slider which is adapted to move above and relative to the recording medium which stores information; and
an optical waveguide which is provided on the slider such that the optical waveguide penetrates the slider in a direction crossing a direction of the relative movement of the slider with respect to the recording medium and a light incident end of the optical waveguide is located at a first position.

12. The optical recording head of claim 9, wherein the support body is made of silicon.

13. The optical recording head of claim 9, wherein the support body includes an optical element support portion which supports the optical element.

14. The optical recording head of claim 9, comprising:
a magnetic recording element which is adapted to perform magnetic information recording.

15. An optical recording apparatus, comprising:
a recording medium;
an optical recording head which is adapted to perform information recording by use of light on a recording medium, the head including:
a light source section which is adapted to emit light;
an optical element for receiving a light beam from the light source section, and focusing and emitting the light beam received from the light source section; and
a support body; the support body having:
a support portion which supports the optical element at a predetermined position such that the light beam emitted from the optical element enters into the support body; and
a total reflection surface for receiving and total reflecting the light beam having entered into the support body such that the light beam reflected by the total reflection surface is focused on an end face of the support body, and
a control section which is adapted to control the optical recording head.

16. An optical recording head for performing information recording by use of light on a recording medium, the head comprising:
a light source section which is adapted to emit light;
an optical element for receiving a light beam from the light source section, and focusing and emitting the light beam received from the light source section; and
a support body; the support body including:
a support portion which supports the light source section and the optical element at a predetermined position such that the light beam emitted from the optical element enters into the support body; and
a total reflection surface for receiving and total reflecting the light beam having entered into the support body such that the light beam reflected by the total reflection surface is focused on an end face of the support body.

* * * * *